United States Patent
Chen et al.

(10) Patent No.: US 7,782,955 B2
(45) Date of Patent: Aug. 24, 2010

(54) TRANSCODER AND TRANSCODING METHOD OPERATING IN A TRANSFORM DOMAIN FOR VIDEO CODING SCHEMES POSSESSING DIFFERENT TRANSFORM KERNELS

(75) Inventors: Chen Chen, Taipei (TW); Ping-Hao Wu, Taipei (TW); Homer H Chen, Tai-Chung (TW)

(73) Assignee: Avisonic Technology Corporation, Hsin-Chu (TW)

( * ) Notice: Subject to any disclaimer, the term of this patent is extended or adjusted under 35 U.S.C. 154(b) by 1317 days.

(21) Appl. No.: 11/162,903

(22) Filed: Sep. 28, 2005

(65) Prior Publication Data

US 2007/0071096 A1 Mar. 29, 2007

(51) Int. Cl.
*H04N 11/04* (2006.01)
*G06K 9/36* (2006.01)

(52) U.S. Cl. .................................. 375/240.2; 382/233

(58) Field of Classification Search ......... 382/232–251; 375/240.02–240.29; 341/67
See application file for complete search history.

(56) References Cited

U.S. PATENT DOCUMENTS 6,748,020 B1 * 6/2004 Eifrig et al. ............ 375/240.26

OTHER PUBLICATIONS

Anthony Vetro, Charilaos Christopoulos. and Huifang Sun., "Video Transcoding Architectures and Techniques: An Overview." IEEE Signal Processing Magazine. Mar. 2003. pp. 18-29.

Chen Chen, Ping-Hao Wu, and Homer Chen, "MPEG-2 to H.264 Transcoding." Appeared on Picture Coding Symposium (PCS) 2004, San Francisco CA USA, Dec. 15-17, 2004.

Chen Chen, Ping-Hao Wu, and Homer Chen, "Transform-Domain Intra Prediction for H.264.", Published on May 2005.

Jun Xin, Chia-Wen Lin, and Ming-Ting Sun, "Digital Video Transcoding." Proceedings of the IEEE, Jan. 2005, pp. 83-97, vol. 93, No. 1.

Junehwa Song, Boon-Lock Yeo. "A Fast Algorithm for DCT-Domain Inverse Motion Compensation Based on Shared Information in a Macroblock." IEEE Transactions on Circuits and Systems for Video Technology, Aug. 2000, pp. 767-775. vol. 10, No. 5.

Neri Merhav. Vasudev Bhaskaran, "Fast Algorithms for DCT-Domain Image Down-Sampling and for Inverse Motion Compensation." IEEE Transactions on Circuits and Systems for Video Technology, Jun. 1997, pp. 468-476, vol. 7, No. 3.

(Continued)

*Primary Examiner*—Duy M Dang
(74) *Attorney, Agent, or Firm*—Winston Hsu

(57) ABSTRACT

A transcoder for converting a digital video signal from a first format into a second format in transform domain. The first format and the second format are respectively adopted by video coding schemes possessing different DCT transform kernels. The transcoder includes: a transform-domain decoder, coupled to the digital video signal, for decoding the digital video signal of the first format to generate a first DCT-domain signal, the first DCT-domain signal corresponding to a first DCT transform of the first format in the transform domain; a transform kernel converter, coupled to the transform-domain decoder, for converting the first DCT-domain signal into a second DCT-domain signal, the second DCT-domain signal corresponding to a second DCT transform of the second format in the transform domain; and a transform-domain encoder, coupled to the transform kernel converter, for generating a resultant video signal encoded in the second format according to the second DCT domain signal.

18 Claims, 6 Drawing Sheets

OTHER PUBLICATIONS

Pedro A. A. Assuncao, Mohammed Ghanbari, "Transcoding of MPEG-2 Video in the Frequency Domain." 1997 IEEE, pp. 2633-2636.

Shih-Fu Chang, and David G. Messerschmitt, "Manipulation and Compositing of MC-DCT Compressed Video," IEEE Journal on Selected Areas in Communications. Jan. 1995. pp. 1-11, vol. 13, No. 1.

Tamer Shanableh, Mohammed Ghanbari, "Hybrid DCT/Pixel Domain Architecture for Heterogeneous Video Transcoding." Signal Processing: Image Communication 18, 2003, pp. 601-620.

* cited by examiner

|   |   |   |   |   |
|---|---|---|---|---|
| M | A | B | C | D |
| I | a | b | c | d |
| J | e | f | g | h |
| K | i | j | k | l |
| L | m | n | o | p |

(With E, F, G, H extending above D column)

Fig. 4

TRANSCODER AND TRANSCODING METHOD OPERATING IN A TRANSFORM DOMAIN FOR VIDEO CODING SCHEMES POSSESSING DIFFERENT TRANSFORM KERNELS

BACKGROUND OF THE INVENTION

1. Field of the Invention

The invention relates to an apparatus and method for video transcoding, and more particularly, to a transcoder and related method operating in a transform domain for video coding schemes possessing different transform kernels.

2. Description of the Prior Art

The development of multimedia systems has necessitated that people devote attention to the problem of interoperability between different systems and different networks. To achieve a goal of interoperability among the various different systems and networks, devices such as gateways, multipoint control units, and servers are developed to provide a seamless transmission or seamless access of a multimedia content from content creation to content consumption. Transcoding of video content is one key technology that can make this seamless environment possible. Transcoding of video is defined as the operation of converting a video from one format into another format. A format is defined by characteristics including but not limited to: bit-rate, frame-rate, spatial resolution, coding syntax, and content.

A video transcoding can always be accomplished in a pixel domain. This is achieved by firstly fully decoding a video signal. The video signal was originally encoded in a first format. Because of fully decoding the video signal, a pixel-based content type signal is produced. Next, following the decoding, an encoding scheme is applied to re-encode the pixel-based content type signal into a video signal of a second format. This approach, however, requires complicated transcoding architecture and is generally not applicable to an apparatus having less computing power. Alternatively, for a block-based video coding scheme using discrete cosine transform (DCT) and motion compensation (MC), a transform-domain transcoding is preferred. In the transform-domain transcoding, a digital video signal of a first format is converted into a second format in DCT domain, allowing one to reduce the system complexity as well as maintain acceptable video quality.

H.264/AVC, a latest international video coding standard jointly developed by the ITU-T Video Coding Experts Group and the ISO/IEC Moving Picture Experts Group (MPEG), achieves higher coding efficiency by employing techniques such as variable block-size motion estimation and mode decision, intra prediction, and multiple reference frames. The emergence of H.264 introduces a non-trivial transcoding problem between itself and the MPEG series standards. This problem does not occur when transcoding video signals between the MPEG series standards themselves. However, H.264 adopts a modified discrete cosine transform (MDCT). The MDCT possesses a transform kernel different for that of the MPEG series standards. Additionally, the H.264 standard utilizes many new techniques that are not defined in MPEG-2 standard. In short, to transcode a digital video signal from an MPEG series standard (e.g., MPEG-2) into H.264 standard, one must overcome issues including but not limited to: transform kernel conversion, motion vector determination, macro-block mode selection, transform block size conversion, and transform-domain intra prediction.

SUMMARY OF THE INVENTION

It is therefore one of the objectives of the claimed invention to provide an apparatus and related method operating in the transform domain for transcoding video coding schemes possessing different transform kernels, to solve the above-mentioned problems.

The claimed invention provides a transcoder for converting a digital video signal from a first format into a second format in the transform domain, the first format and the second format being respectively adopted by video coding schemes possessing different DCT transform kernels. The transcoder comprises a transform-domain decoder, coupled to the digital video signal, for decoding the digital video signal of the first format to generate a first DCT-domain signal, the first DCT-domain signal corresponding to a first DCT transform of the first format in the transform domain; a transform kernel converter, coupled to the transform-domain decoder, for converting the first DCT-domain signal into a second DCT-domain signal, the second DCT-domain signal corresponding to a second DCT transform of the second format in the transform domain; and a transform-domain encoder, coupled to the transform kernel converter, for generating a resultant video signal encoded in the second format according to a differential signal. The transform-domain encoder comprises an adder for subtracting a prediction signal from the second DCT-domain signal to generate the differential signal; and an intra predictor, coupled to the adder and the transform kernel converter, for generating the prediction signal in the transform domain according to the second DCT-domain signal.

The claimed invention further provides a transcoding method for converting a digital video signal from a first format into a second format in the transform domain, the first format and the second format being respectively adopted by video coding schemes possessing different DCT transform kernels. The transcoding method comprises decoding the digital video signal of the first format to generate a first DCT-domain signal, the first DCT-domain signal corresponding to a first DCT transform of the first format in the transform domain; converting the first DCT-domain signal into a second DCT-domain signal, the second DCT-domain signal corresponding to a second DCT transform of the second format in the transform domain; and generating a resultant video signal encoded in the second format according to a differential signal. The step of generating the resultant video signal comprises subtracting a prediction signal from the second DCT-domain signal to generate the differential signal; and generating the prediction signal in the transform domain according to the second DCT-domain signal.

The claimed invention converts an MPEG-2 input signal into an H.264 output signal in the transform domain. In this way, computational complexity is reduced and the transcoding architecture is simplified. Additionally, the claimed invention is performing a down-sampling operation in conjunction with a transform kernel conversion operation to save computational cost compared to that of performing the down-sampling operation and the transform kernel conversion operation separately. Moreover, by an above-mentioned approach for computing the candidate intra-predictions, parameters obtained after computing a specific candidate intra-prediction may also be utilized when computing some other candidate intra-predictions, further reducing computational complexity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a notation of adjacent pixels to a current predicting block used in a 4×4 intra-prediction operation.

DETAILED DESCRIPTION

Figure 1:
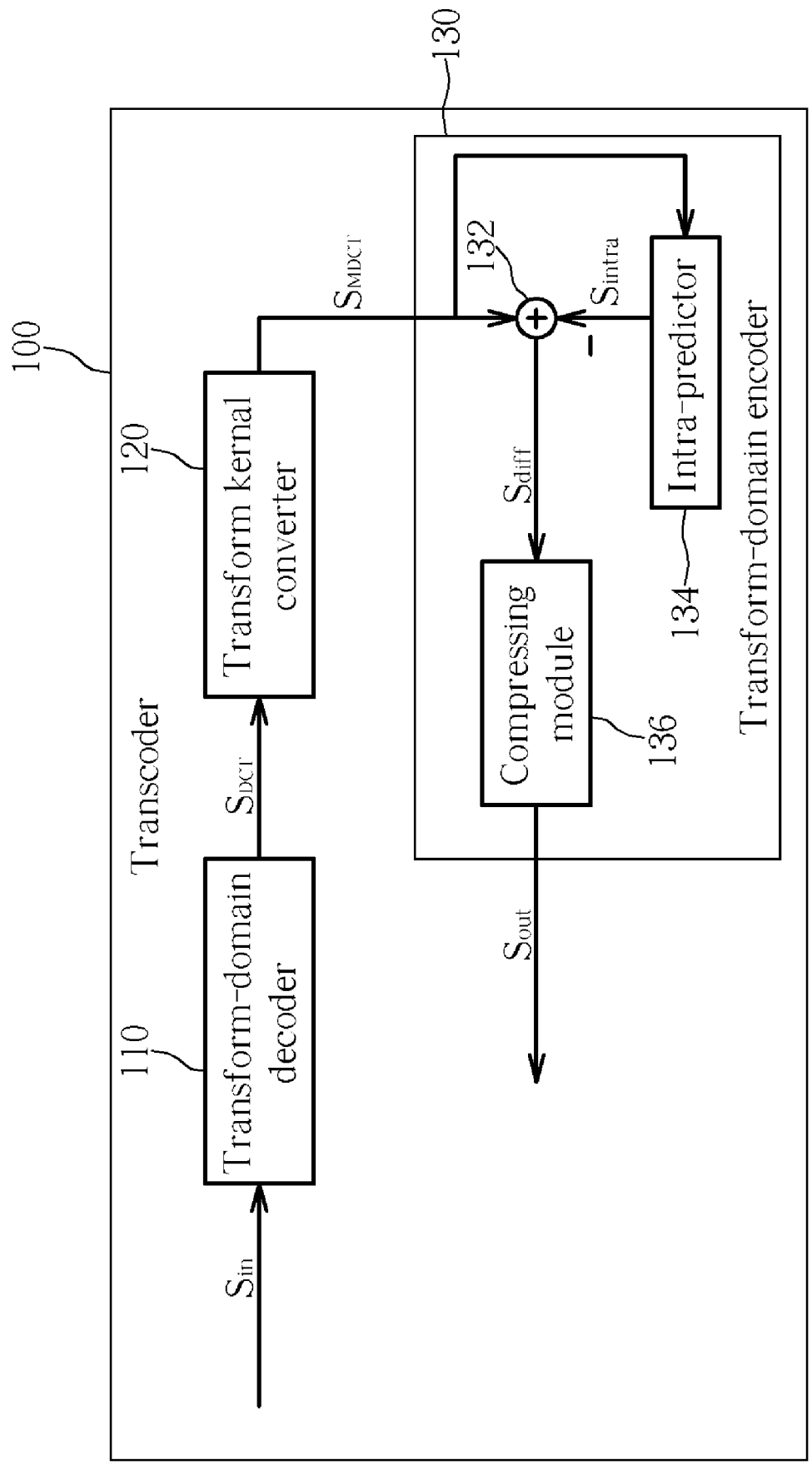
FIG. 1 is a block diagram illustrating a transcoder for I-frame according to a first embodiment of the present invention.

Please refer to FIG. 1. FIG. 1 is a block diagram illustrating a transcoder 100 for I-frame according to a first embodiment of the present invention. In this embodiment, assume that a digital video signal $S_{in}$, which is an input signal of the transcoder 100, complies with the MPEG-2 specification and a resultant video signal $S_{out}$, which is an output signal of the transcoder 100, complies with the H.264 specification. It is well known that MPEG-2 and H.264 specifications both are block-based video coding schemes. Please note that an image content represented in pixel values is compressed and encoded to comply with MPEG-2 standard by firstly performing a discrete cosine transform (DCT) operation on the image content to generate a DCT-domain image content. Then the DCT-domain image content is further compressed or encoded to fully comply with MPEG-2 specification. The transcoder 100 in FIG. 1 only illustrates an I-frame (intra frame) transcoding architecture.

In the transcoder 100, when the digital video signal $S_{in}$ is inputted into the transform-domain decoder 110, the transform-domain decoder 110 decodes the digital video signal $S_{in}$ to generate a DCT-domain signal $S_{DCT}$ in the DCT domain and then the DCT-domain signal $S_{DCT}$ is fed into the following transform kernel converter 120. A transform domain for the digital video signal is a DCT-domain. However, a transform domain for the resultant video signal means an MDCT-domain (modified discrete cosine transform domain). Since a DCT transform and a MDCT transform possess different transform kernels, a transform kernel conversion operation is required when transcoding an MPEG-2 signal into an H.264 signal in the transform domain. Therefore, the transform kernel converter 120 performs a linear transform on the DCT-domain signal $S_{DCT}$ to generate an MDCT-domain signal $S_{MDCT}$. The linear transform corresponds to the transform kernel conversion and is a combination of an MDCT transform and an inverse transform of a DCT transform. Please note that when performing the transform kernel conversion operation, the transform kernel converter 120 can also down-sample the DCT-domain signal $S_{DCT}$ at the same time to reduce an image resolution of the resultant video signal $S_{out}$. In this way, a total computational complexity of converting the transform kernel as well as lowering the image resolution is reduced since the down-sampling operation is integrated with the transform kernel conversion. A detailed description about the transform kernel conversion and the down-sampling operation will be presented later.

After the MDCT-domain signal $S_{MDCT}$ is inputted into a transform-domain encoder 130, the MDCT-domain signal $S_{MDCT}$ is fed into an adder 132 and an intra-predictor 134. The intra-predictor 134 performs an intra-prediction operation complying with the H.264 specification to generate an intra-prediction signal $S_{intra}$. The intra-predictor 134 generates a plurality of candidate predictions corresponding to a specific block of a specific image frame (I frame) of the MDCT-domain signal $S_{MDCT}$, and each candidate prediction corresponds to a specific prediction mode as specified in the H.264 specification. According to a cost function and the MDCT-domain signal $S_{MDCT}$, the intra-predictor 134 selects a best prediction with a minimum cost value from these candidate predictions, and then outputs the best prediction as the intra-prediction signal $S_{intra}$. A cost value defined by the cost function corresponds to a difference between a candidate prediction and the specific block of the specific image frame transmitted by the MDCT-domain signal $S_{MDCT}$. The intra-prediction operation is performed in the pixel domain according to the H.264 specification and is based on at least a block adjacent to the specific block on the specific image frame. However, the intra-predictor 134 has only the MDCT-domain signal $S_{MDCT}$ as input. In order to perform the intra prediction operation in the transform domain, a plurality of predetermined operation matrices are utilized. Each of the prediction modes chooses a specific subset of the predetermined operation matrices applied to the MDCT-domain signal $S_{MDCT}$ for generating a corresponding candidate prediction. The predetermined operation matrices as well as the candidate predictions in the transform domain will be further described later.

An adder 132 subtracts the intra-prediction signal $S_{intra}$ from the MDCT-domain signal $S_{MDCT}$ and then outputs a difference signal $S_{diff}$. In a compressing module 136, a quantizer and an entropy encoder, which are not shown in FIG. 1, further quantize and encode the difference signal $S_{diff}$ to generate the resultant video signal $S_{out}$, which fully complies with the H.264 specification.

Figure 2:
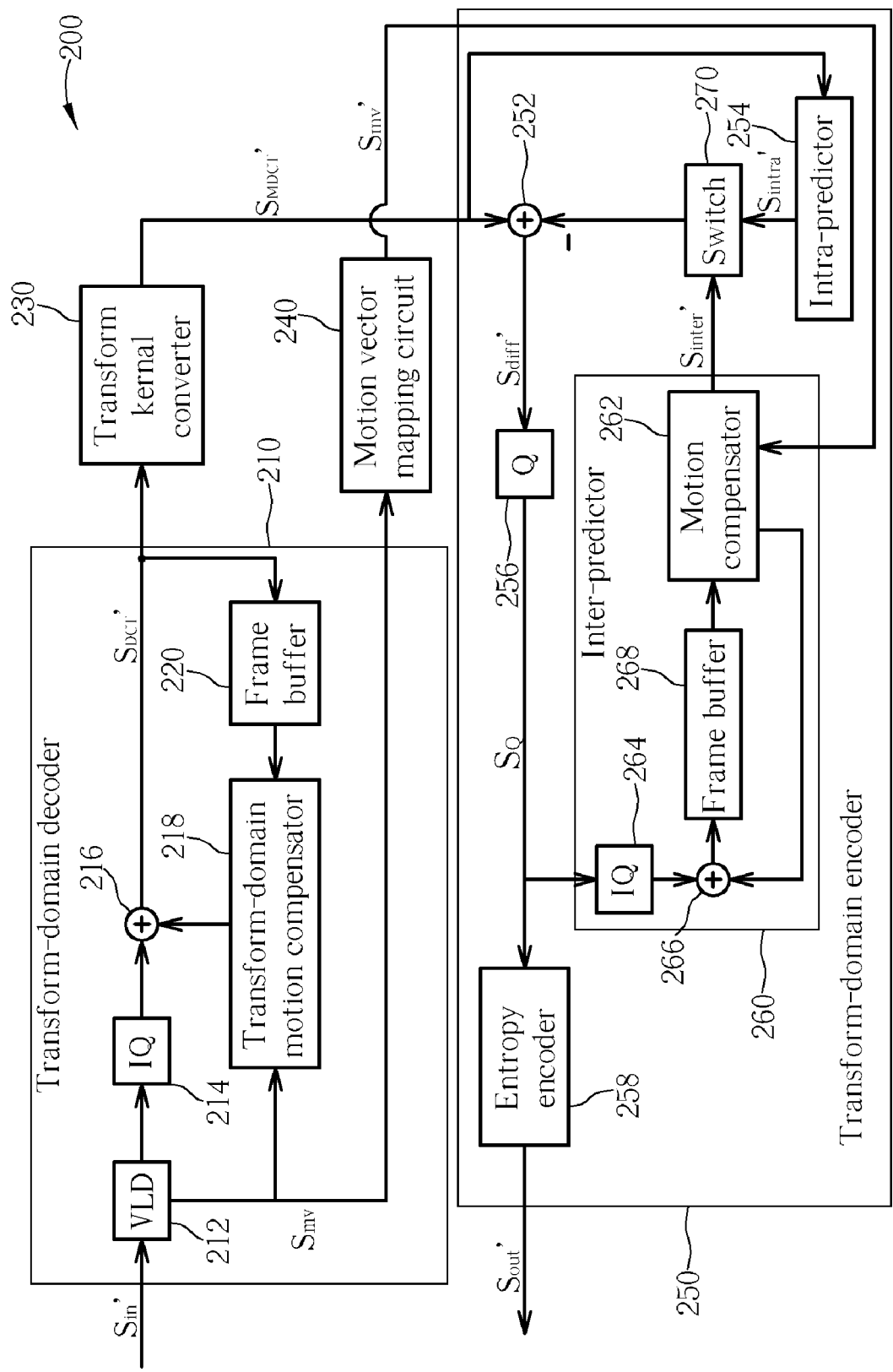
FIG. 2 is a block diagram illustrating a transcoder for both I-frame and P-frame according to a second embodiment of the present invention.

Please refer to FIG. 2. FIG. 2 is a block diagram illustrating a transcoder 200 for both I-frame and P-frame (inter frame) according to a second embodiment of the present invention. For both I-frame and P-frame, the transcoder 200 utilizes a transcoding scheme for transcoding an MPEG-2 video signal (digital video signal $S_{in}'$) to an H.264 video signal (resultant video signal $S_{out}'$). The transcoder 200 includes a transform-domain decoder 210, a transform kernel converter 230, a motion vector mapping circuit 240, and a transform-domain encoder 250. The transform-domain decoder 210 contains a variable-length decoder (VLD) 212, an inverse quantizer (IQ) 214, an adder 216, a transform-domain motion compensator 218, and a frame buffer 220. A feedback loop consisted of the adder 216, the transform-domain motion compensator 218, and the frame buffer 220 is utilized to recover a P-frame in the transform domain. Since functionality and operation of the VLD 212, IQ 214, and the feedback loop is well known to those skilled in this art, further description is omitted here for brevity.

The functionality of the transform kernel converter 230 is the same as that of the transform kernel converter 120 shown in FIG. 1. An output signal of the transform-domain decoder 210, a DCT-domain signal $S_{DCT}'$, undergoes a transform kernel conversion operation in conjunction with a down-sampling operation in the transform kernel converter 230, thereby generating an MDCT-domain signal $S_{MDCT}'$.

A motion vector signal $S_{mv}$ extracted from the digital video signal $S_{in}'$ by the VLD 212 is outputted from the transform-domain decoder 210 and fed into the motion vector mapping circuit 240. The motion vector signal $S_{mv}$ transmits a plurality of motion vectors corresponding to a plurality of blocks of an image frame. If the transform kernel converter 230 does not perform the down-sampling operation on the DCT-domain signal $S_{DCT}'$, the motion vector mapping circuit 240 bypasses the motion vector signal $S_{mv}$ such that a motion vector signal $S_{mv}'$ outputted from the motion vector mapping circuit 240 is identical to the motion vector signal $S_{mv}$ inputted into the motion vector mapping circuit 240. On the other hand, if the transform kernel converter 230 does perform the down-sampling operation on the DCT-domain signal $S_{DCT}'$, as the present embodiment, the motion vector mapping circuit 240 needs to determine the new motion vector signal $S_{mv}'$, which is needed in the transform-domain encoder 250. In this embodiment, the transform kernel converter 230 down-samples the DCT-domain signal $S_{DCT}'$ to reduce an image resolution of an image frame to half original size. In other words, in the transform kernel converter 230, every four macro-blocks are down-sampled into one resulting macro-block and a motion vector of the resulting macro-block has to be determined since four original motion vectors corresponding to these four macro-blocks, respectively, are likely to be different. In the motion vector mapping circuit 240, an approach called adaptive motion vector re-sampling (AMVR) method is utilized to generate the desired new motion vector signal $S_{mv}'$. Since AMVR method is a prior art technique and is well known to people with ordinary skill in the art, further description about AMVR method is omitted for brevity. Please note that the AMVR method adopted here in the motion vector mapping circuit 240 is only an example for mapping motion vectors and is not meant to be a limitation to the present invention. Any other method capable of achieving a similar functionality as the AMVR method can be utilized here.

Figure 3:
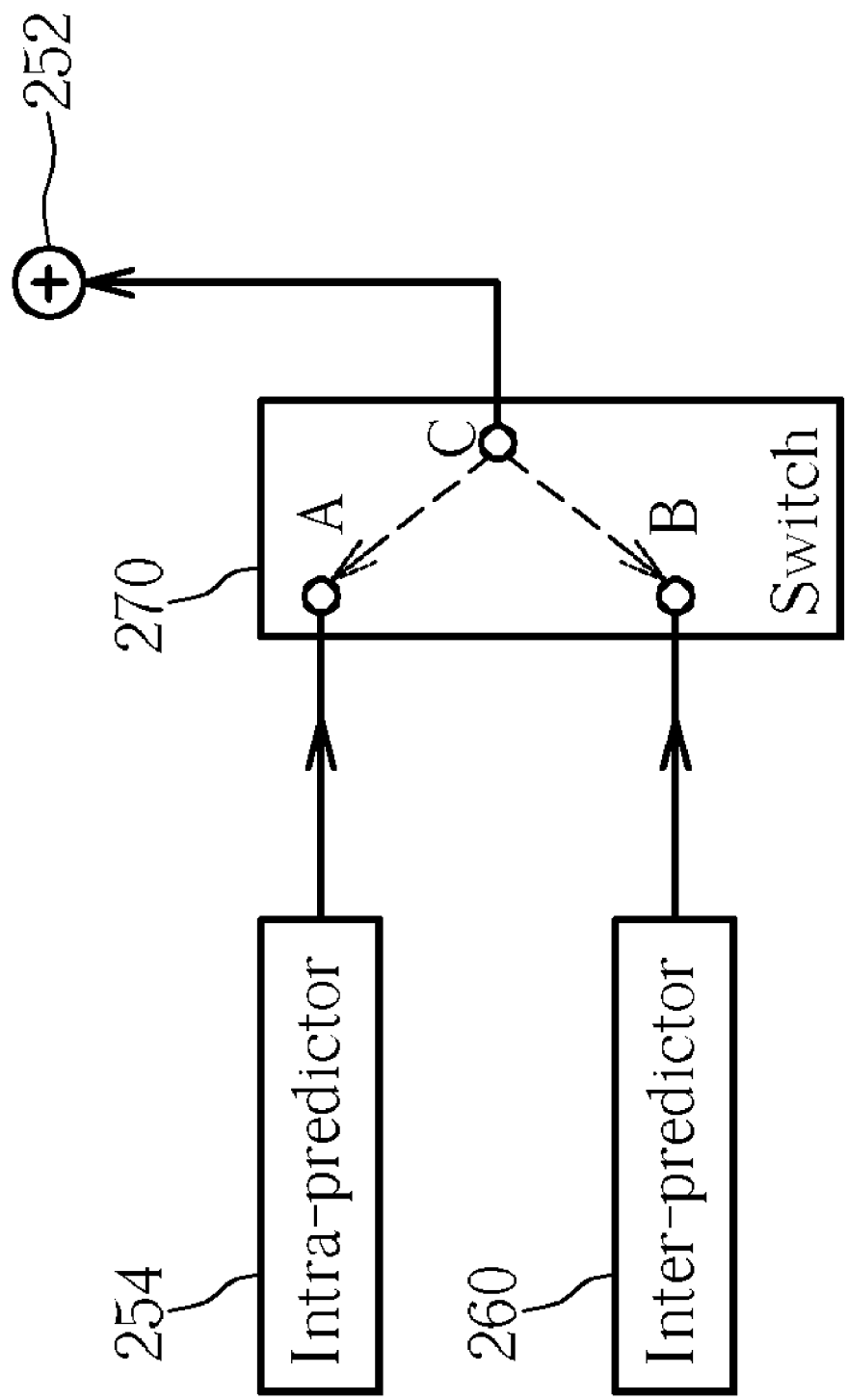
FIG. 3 is a detailed diagram illustrating two schemes corresponding to two possible selections of a switch shown in FIG. 2.

As shown in FIG. 2, the transform-domain encoder 250 includes an adder 252, an intra-predictor 254, a quantizer 256, an entropy encoder 258, an inter-predictor 260 and a switch 270. The switch 270 selectively allows an output from the intra-predictor 254 or an output from the inter-predictor 260 to pass through, depending on whether the MDCT-domain signal $S_{MDCT}'$ corresponds to an I-frame or a P-frame. Please refer to FIG. 3. FIG. 3 is a detailed diagram illustrating two schemes corresponding to two possible selections of the switch 270 shown in FIG. 2. The switch 270 has two input nodes A and B coupled to the intra-predictor 254 and the inter-predictor and one output node C coupled to the adder 252. If the MDCT-domain signal $S_{MDCT}'$ corresponds to an I-frame, the switch 270 connects input node A to the output node C, passing output of the intra-predictor 254 (intra-prediction signal $S_{intra}'$) to the adder 252. However, if the MDCT-domain signal $S_{MDCT}'$ corresponds to a P-frame, the switch 270 connects the other input node B to the output node C, passing output of the inter-predictor 260 (inter-prediction signal $S_{inter}'$) to the adder 252.

When the MDCT-domain signal $S_{MDCT}'$ corresponds to an I-frame, similar to the operation of the transform-domain encoder 130 shown in FIG. 1, the adder 252 outputs a difference signal $S_{diff}'$, representing a difference between the MDCT-domain signal $S_{MDCT}'$ and the intra-prediction signal $S_{intra}'$. The difference signal $S_{diff}'$ is fed into the quantizer 256 and then the entropy encoder 258 orderly to generate a resultant video signal $S_{out}'$, which complies with the H.264 specification. Please note that an output of the quantizer 256, a quantized signal $S_Q$, is further inputted into the inter-predictor 260. According to the quantized signal $S_Q$ and the new motion vector signal $S_{mv}'$, the inter-predictor 260 will perform a transform-domain motion compensation on a plurality of P-frames following a specific I-frame to estimate the P-frames transmitted by the MDCT-domain signal $S_{MDCT}'$. The operation of the transform-domain motion compensation in the inter-predictor 260 is a prior art technique and further description is omitted here for brevity. As described above, the I-frame transcoding architecture of the present invention can cooperate with any P-frame transcoding architecture to build a full-function transcoder.

Features of the present invention are further detailed in an example illustrating the operation of the transcoder 100 shown in FIG. 1. The down-sampling operation performed in the transform kernel converter 120 reduces an image resolution to half an original size. That is to say, the digital video signal $S_{in}$ inputted to the transcoder 100 is a full resolution MPEG-2 video bit-stream and the resultant video signal $S_{out}$ outputted to the transcoder 100 is a half resolution H.264 video bit-stream. Please note that in MPEG-2 specification, a block size of 8×8 is adopted while in H.264 specification, a bock size of 4×4 is adopted. In the following, an upper case letter is utilized to represent a block of transform-domain coefficients and a lower case letter is utilized to represent a block of pixel values. Let $x_i$, i=1 ... 4, be the four 8×8 blocks before the down-sampling operation and y be the 8×8 block after the down-sampling operation. The down-sampling operation adopted here is simply a 2×2 averaging filter and can be represented in a matrix form as:

$$y = \frac{1}{4}(q_1 x_1 q_1^t + q_1 x_2 q_2^t + q_2 x_3 q_1^t + q_2 x_4 q_2^t) \tag{1}$$

$$\text{where } q_1 = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \text{ and } q_2 = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}$$

Denote an operation of DCT transform on a pixel-valued block x in a matrix form as:

$$X = SxS^t \quad (2)$$

where x is a DCT-domain coefficient block corresponding to the pixel-valued block x. Then, the pixel-valued block x can be further represented by the DCT-domain coefficient block X as:

$$x = S^t X S \quad (3)$$

Rewrite Eq. (1), an equation is obtained as:

$$y = \frac{1}{4}(q_1 S^t X_1 S q_1^t + q_1 S^t X_2 S q_2^t + q_2 S^t X_3 S q_1^t + q_2 S^t X_4 S q_2^t) \quad (4)$$

By Eq. (4), y, a pixel-valued block after the down-sampling operation, is represented by four DCT-domain coefficient blocks $X_i$, i=1 . . . 4, which correspond to the four pixel-valued blocks $x_i$, i=1 . . . 4, respectively.

Since the block size of H.264 is 4×4, y is divided into four sub-blocks $z_i$, i=1 . . . 4. Let T be a transform matrix for a 4×4 MDCT:

$$T = \begin{bmatrix} 0.5 & 0.5 & 0.5 & 0.5 \\ \sqrt{2/5} & \sqrt{1/10} & -\sqrt{1/10} & -\sqrt{2/5} \\ 0.5 & -0.5 & -0.5 & 0.5 \\ \sqrt{1/10} & -\sqrt{2/5} & \sqrt{2/5} & -\sqrt{1/10} \end{bmatrix} \quad (5)$$

Then the MDCT transform of $z_i$, i=1 . . . 4, is written as:

$$Y = \begin{bmatrix} Z_1 & Z_2 \\ Z_3 & Z_4 \end{bmatrix} \quad (6)$$

$$= \begin{bmatrix} T z_1 T^t & T z_2 T^t \\ T z_3 T^t & T z_4 T^t \end{bmatrix}$$

$$= \begin{bmatrix} T & 0 \\ 0 & T \end{bmatrix} \begin{bmatrix} z_1 & z_2 \\ z_3 & z_4 \end{bmatrix} \begin{bmatrix} T^t & 0 \\ 0 & T^t \end{bmatrix}$$

$$= \begin{bmatrix} T & 0 \\ 0 & T \end{bmatrix} y \begin{bmatrix} T^t & 0 \\ 0 & T^t \end{bmatrix}$$

Thus, $$Y = \frac{1}{4}\left( \begin{bmatrix} T & 0 \\ 0 & T \end{bmatrix} q_1 S^t X_1 S q_1^t \begin{bmatrix} T^t & 0 \\ 0 & T^t \end{bmatrix} + \begin{bmatrix} T & 0 \\ 0 & T \end{bmatrix} q_1 S^t X_2 S q_2^t \begin{bmatrix} T^t & 0 \\ 0 & T^t \end{bmatrix} + \begin{bmatrix} T & 0 \\ 0 & T \end{bmatrix} q_2 S^t X_3 S q_1^t \begin{bmatrix} T^t & 0 \\ 0 & T^t \end{bmatrix} + \begin{bmatrix} T & 0 \\ 0 & T \end{bmatrix} q_2 S^t X_4 S q_2^t \begin{bmatrix} T^t & 0 \\ 0 & T^t \end{bmatrix} \right) \quad (7)$$

$$= \frac{1}{4}(U_1 X_1 U_1^t + U_1 X_2 U_2^t + U_2 X_3 U_1^t + U_2 X_4 U_2^t)$$

where $$U_1 = \begin{bmatrix} T & 0 \\ 0 & T \end{bmatrix} q_1 S^t \text{ and } U_2 = \begin{bmatrix} T & 0 \\ 0 & T \end{bmatrix} q_2 S^t \quad (8)$$

Therefore, both the transform kernel conversion operation and the down-sampling operation in the transform kernel converter 120 can be easily accomplished by two operation matrices $U_1$ and $U_2$ defined in Eq. (8).

Please note that the reduction of the image resolution to half the original size is just an example of a possible down-sampling rate. Other down-sampling rates can also be utilized according to design requirements. Further, the down-sampling operation utilized above, a 2×2 averaging filter; can easily be replaced by other methods. That is, the disclosed 2×2 averaging filter is only for illustrative purposes, and is not meant to be taken as limitations to the present invention.

Below, the intra-prediction operation of the intra-predictor 134 in the transcoder 100 is detailed. In the intra-predictor 134, the candidate predictions are generated on MDCT-domain first, and a plurality of cost values corresponding to the candidate predictions are calculated according to a cost function and the MDCT-domain signal $S_{MDCT}$. The cost values used by the intra-predictor 134 need to be computed in transform domain. As known to those skilled in this art, only a linear transform (MDCT transform) is involved in transforming a cost function applied in pixel domain into a wanted cost function applied in transform domain. Since the transforming of the cost function is a trivial work, only the generation of the candidate predictions will be discussed below. Please note that, in what follows, only an MDCT-domain intra-prediction of luminance samples is discussed. An MDCT-domain intra-prediction of chrominance samples can be easily derived in a similar way and is omitted here for brevity.

Figure 5:
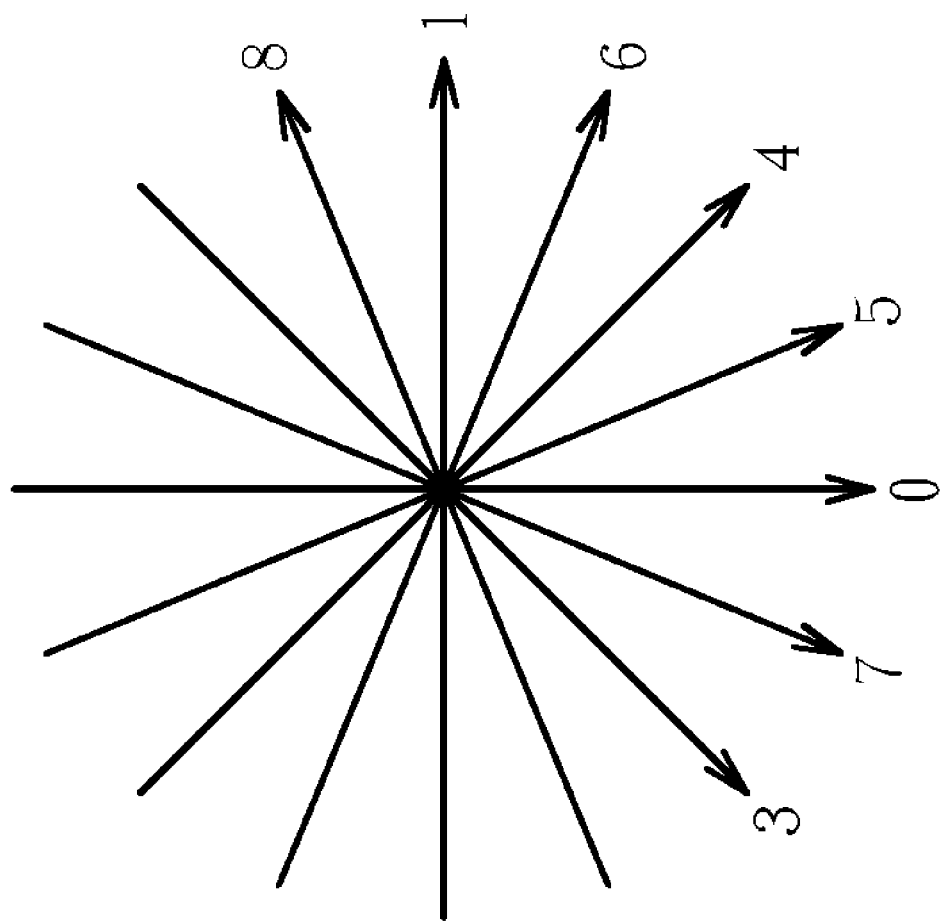
FIG. 5 is a diagram illustrating a plurality of directions utilized for an intra-prediction operation.

Please refer to FIG. 4. FIG. 4 is a diagram illustrating a notation of adjacent pixels to a current predicting block used in a 4×4 intra-prediction operation. As shown in FIG. 4, symbols from a to p denote the pixels of a current predicting block to be predicted, and symbols from A to M denote neighboring pixels, based on which the current predicting block is predicted. FIG. 5 is a diagram illustrating a plurality of directions utilized by an intra-prediction operation. In the following, a vertical mode, a DC mode, and a diagonal_down_left mode of a 4×4 intra-prediction are illustrated to detail the operation of the intra-predictor 120.

In vertical mode, four prediction samples are obtained from four neighboring pixels (A to D) above the current predicting block. Sample A is copied to every pixel in a first column of the block, sample B is copied to every pixel in a second column of the block, and so on. The current predicting block can be represented in a matrix form as:

$$\begin{bmatrix} A & B & C & D \\ A & B & C & D \\ A & B & C & D \\ A & B & C & D \end{bmatrix} = \begin{bmatrix} 0 & 0 & 0 & 1 \\ 0 & 0 & 0 & 1 \\ 0 & 0 & 0 & 1 \\ 0 & 0 & 0 & 1 \end{bmatrix} \begin{bmatrix} x & x & x & x \\ x & x & x & x \\ x & x & x & x \\ A & B & C & D \end{bmatrix} \quad (9)$$

where the symbol "x" represents "don't care" pixel. Denoting the 4×4 MDCT transform by T( ) and applying it to Eq. (9), a candidate prediction corresponding to the vertical mode is given by:

$$T\left(\begin{bmatrix} A & B & C & D \\ A & B & C & D \\ A & B & C & D \\ A & B & C & D \end{bmatrix}\right) = T\left(\begin{bmatrix} 0 & 0 & 0 & 1 \\ 0 & 0 & 0 & 1 \\ 0 & 0 & 0 & 1 \\ 0 & 0 & 0 & 1 \end{bmatrix}\right) T\left(\begin{bmatrix} \times & \times & \times & \times \\ \times & \times & \times & \times \\ \times & \times & \times & \times \\ A & B & C & D \end{bmatrix}\right) \quad (10)$$

$$= \begin{bmatrix} 1 & -\sqrt{\frac{8}{5}} & 1 & -\sqrt{\frac{2}{5}} \\ 0 & 0 & 0 & 0 \\ 0 & 0 & 0 & 0 \\ 0 & 0 & 0 & 0 \end{bmatrix} T\left(\begin{bmatrix} \times & \times & \times & \times \\ \times & \times & \times & \times \\ \times & \times & \times & \times \\ A & B & C & D \end{bmatrix}\right)$$

Therefore, given an MDCT-domain coefficient block, which is an adjacent upper block of the current predicting block, a vertical mode prediction is generated in the MDCT domain by a vertical mode operation matrix defined by:

$$\begin{bmatrix} 1 & -\sqrt{\frac{8}{5}} & 1 & -\sqrt{\frac{2}{5}} \\ 0 & 0 & 0 & 0 \\ 0 & 0 & 0 & 0 \\ 0 & 0 & 0 & 0 \end{bmatrix}$$

As to the DC mode, a plurality of prediction samples are obtained from both upper and left blocks and a current predicting block under DC mode is expressed as:

$$\left(\frac{A+B+C+D+I+J+K+L}{8}\right)\begin{bmatrix} 1 & 1 & 1 & 1 \\ 1 & 1 & 1 & 1 \\ 1 & 1 & 1 & 1 \\ 1 & 1 & 1 & 1 \end{bmatrix} = \quad (11)$$

$$\frac{1}{8}\begin{bmatrix} A & B & C & D \\ A & B & C & D \\ A & B & C & D \\ A & B & C & D \end{bmatrix}\begin{bmatrix} 1 & 1 & 1 & 1 \\ 1 & 1 & 1 & 1 \\ 1 & 1 & 1 & 1 \\ 1 & 1 & 1 & 1 \end{bmatrix} + \frac{1}{8}\begin{bmatrix} I & I & I & I \\ J & J & J & J \\ K & K & K & K \\ L & L & L & L \end{bmatrix}\begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Similar to the vertical mode, after applying a MDCT transform to Eq. (11), a DC mode prediction is obtained. Please note that except the matrix with all elements equal to one, the other two matrices' MDCT transforms have already been computed in the vertical mode and a horizontal mode, respectively.

For a diagonal_down_left (DDL) mode, a current predicting block under DDL mode is expressed by:

$$\frac{1}{4}\begin{bmatrix} A+2B+C & B+2C+D & C+2D+E & D+2E+F \\ B+2C+D & C+2D+E & D+2E+F & E+2F+G \\ C+2D+E & D+2E+F & E+2F+G & F+2G+H \\ D+2E+F & E+2F+G & F+2G+H & G+3H \end{bmatrix} = \quad (12)$$

$$\frac{1}{4}\left(\begin{bmatrix} A+B+C & B+2C+D & C+2D & D \\ B+2C+D & C+2D & D & 0 \\ C+2D & D & 0 & 0 \\ D & 0 & 0 & 0 \end{bmatrix} + \right.$$

-continued $$\left.\begin{bmatrix} 0 & 0 & E & 2E+F \\ 0 & E & 2E+F & E+2F+G \\ E & 2E+F & E+2F+G & F+2G+H \\ 2E+F & E+2F+G & F+2G+H & G+3H \end{bmatrix}\right)$$

In Eq. (12), each row in the first matrix on the right-hand side can be expressed as follows:

$$\begin{bmatrix} A+2B+C & B+2C+D & C+2D & D \\ 0 & 0 & 0 & 0 \\ 0 & 0 & 0 & 0 \\ 0 & 0 & 0 & 0 \end{bmatrix} = \begin{bmatrix} 0 & 0 & 0 & 1 \\ 0 & 0 & 0 & 0 \\ 0 & 0 & 0 & 0 \\ 0 & 0 & 0 & 0 \end{bmatrix} \quad (13)$$

$$\begin{bmatrix} \times & \times & \times & \times \\ \times & \times & \times & \times \\ \times & \times & \times & \times \\ A & B & C & D \end{bmatrix}\begin{bmatrix} 1 & 0 & 0 & 0 \\ 2 & 1 & 0 & 0 \\ 1 & 2 & 1 & 0 \\ 0 & 1 & 2 & 1 \end{bmatrix}\begin{bmatrix} 0 & 0 & 0 & 0 \\ B+2C+D & C+2D & D & 0 \\ 0 & 0 & 0 & 0 \\ 0 & 0 & 0 & 0 \end{bmatrix}$$

$$= \begin{bmatrix} 0 & 0 & 0 & 0 \\ 0 & 0 & 0 & 1 \\ 0 & 0 & 0 & 0 \\ 0 & 0 & 0 & 0 \end{bmatrix}\begin{bmatrix} \times & \times & \times & \times \\ \times & \times & \times & \times \\ \times & \times & \times & \times \\ A & B & C & D \end{bmatrix}\begin{bmatrix} 0 & 0 & 0 & 0 \\ 1 & 0 & 0 & 0 \\ 2 & 1 & 0 & 0 \\ 1 & 2 & 1 & 0 \end{bmatrix} \quad (14)$$

$$\begin{bmatrix} 0 & 0 & 0 & 0 \\ 0 & 0 & 0 & 0 \\ C+2D & D & 0 & 0 \\ 0 & 0 & 0 & 0 \end{bmatrix} = \begin{bmatrix} 0 & 0 & 0 & 0 \\ 0 & 0 & 0 & 0 \\ 0 & 0 & 0 & 1 \\ 0 & 0 & 0 & 0 \end{bmatrix}\begin{bmatrix} \times & \times & \times & \times \\ \times & \times & \times & \times \\ \times & \times & \times & \times \\ A & B & C & D \end{bmatrix}\begin{bmatrix} 0 & 0 & 0 & 0 \\ 0 & 0 & 0 & 0 \\ 1 & 0 & 0 & 0 \\ 2 & 1 & 0 & 0 \end{bmatrix} \quad (15)$$

$$\begin{bmatrix} 0 & 0 & 0 & 0 \\ 0 & 0 & 0 & 0 \\ 0 & 0 & 0 & 0 \\ D & 0 & 0 & 0 \end{bmatrix} = \begin{bmatrix} 0 & 0 & 0 & 0 \\ 0 & 0 & 0 & 0 \\ 0 & 0 & 0 & 0 \\ 0 & 0 & 0 & 1 \end{bmatrix}\begin{bmatrix} \times & \times & \times & \times \\ \times & \times & \times & \times \\ \times & \times & \times & \times \\ A & B & C & D \end{bmatrix}\begin{bmatrix} 0 & 0 & 0 & 0 \\ 0 & 0 & 0 & 0 \\ 0 & 0 & 0 & 0 \\ 1 & 0 & 0 & 0 \end{bmatrix} \quad (16)$$

A summation of four blocks described by Eq. (13) to Eq. (16) gives rise to the first matrix on the right-hand side of Eq. (12). The second matrix on the right-hand side of Eq. (12) can be calculated similarly. It is noted that the first matrices on the right-hand side of Eq. (13) to Eq. (16) have a vertical shift relationship and this vertical shift relationship can be further exploited to simplify the computation.

Firstly, take the MDCT transform of the first matrices on the right-hand side of Eq. (13) to Eq. (14) and denote them by $U_1$, $U_2$, $U_3$, $U_4$, respectively:

$$U_1 = T\left(\begin{bmatrix} 0 & 0 & 0 & 1 \\ 0 & 0 & 0 & 0 \\ 0 & 0 & 0 & 0 \\ 0 & 0 & 0 & 0 \end{bmatrix}\right)$$

$$U_2 = T\left(\begin{bmatrix} 0 & 0 & 0 & 0 \\ 0 & 0 & 0 & 1 \\ 0 & 0 & 0 & 0 \\ 0 & 0 & 0 & 0 \end{bmatrix}\right)$$

$$U_3 = T\left(\begin{bmatrix} 0 & 0 & 0 & 0 \\ 0 & 0 & 0 & 0 \\ 0 & 0 & 0 & 1 \\ 0 & 0 & 0 & 0 \end{bmatrix}\right)$$

-continued $$U_4 = T\left(\begin{bmatrix} 0 & 0 & 0 & 0 \\ 0 & 0 & 0 & 0 \\ 0 & 0 & 0 & 0 \\ 0 & 0 & 0 & 1 \end{bmatrix}\right)$$

Then, multiply $U_1$ with the MDCT transform of an adjacent upper block denoted by P. The result of this multiplication is expressed by $R_1$ shown below:

$$R_1 = U_1 P = \begin{bmatrix} a & -b & a & c \\ \sqrt{\frac{8}{5}}a & -\sqrt{\frac{8}{5}}b & \sqrt{\frac{8}{5}}a & \sqrt{\frac{8}{5}}c \\ a & -b & a & c \\ \sqrt{\frac{2}{5}}a & -\sqrt{\frac{2}{5}}b & \sqrt{\frac{2}{5}}a & \sqrt{\frac{2}{5}}c \end{bmatrix} P \quad (17)$$

where $a = \frac{1}{4}, b = \sqrt{\frac{1}{10}}, c = \sqrt{\frac{1}{40}}$, and $$P = T\left(\begin{bmatrix} \times & \times & \times & \times \\ \times & \times & \times & \times \\ \times & \times & \times & \times \\ A & B & C & D \end{bmatrix}\right) = \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \quad (18)$$

Let $S_0 = a(X_{11} + X_{31}) - bX_{21} + cX_{41}$ $S_1 = a(X_{12} + X_{32}) - bX_{22} + cX_{42}$ $S_2 = a(X_{13} + X_{33}) - bX_{23} + cX_{43}$ (19)

$S_3 = a(X_{14} + X_{34}) - bX_{24} + cX_{44}$

Rewite Eq. (17) to get the following equation:

$$R_1 = \begin{bmatrix} S_0 & S_1 & S_2 & S_3 \\ \sqrt{\frac{8}{5}}S_0 & \sqrt{\frac{8}{5}}S_1 & \sqrt{\frac{8}{5}}S_2 & \sqrt{\frac{8}{5}}S_3 \\ S_0 & S_1 & S_2 & S_3 \\ \sqrt{\frac{2}{5}}S_0 & \sqrt{\frac{2}{5}}S_1 & \sqrt{\frac{2}{5}}S_2 & \sqrt{\frac{2}{5}}S_3 \end{bmatrix} = \begin{bmatrix} \tilde{R}_1 \\ \tilde{R}_2 \\ \tilde{R}_1 \\ \tilde{R}_3 \end{bmatrix} \quad (20)$$

where $\tilde{R}_i$, i=1-3 denotes different row vectors of $R_1$. Because of the vertical shift relationship mentioned above, one has:

$$R_2 = U_2 P = \begin{bmatrix} \tilde{R}_1 \\ \tilde{R}_3 \\ -\tilde{R}_1 \\ -\tilde{R}_2 \end{bmatrix} \quad (21)$$

$$R_3 = U_3 P = \begin{bmatrix} \tilde{R}_1 \\ -\tilde{R}_3 \\ -\tilde{R}_1 \\ \tilde{R}_2 \end{bmatrix}$$

$$R_4 = U_4 P = \begin{bmatrix} \tilde{R}_1 \\ -\tilde{R}_2 \\ \tilde{R}_1 \\ -\tilde{R}_3 \end{bmatrix}$$

In this way, the computation of the DDL prediction mode is simplified.

By similar way, other 4×4 intra-predictions corresponding to different intra-prediction modes can be derived easily. According to the examples given above, it is a trivial work effort for people with ordinary skill in the art to easily derive remaining 4×4 intra-predictions. Further description is omitted here for brevity.

Figure 6:
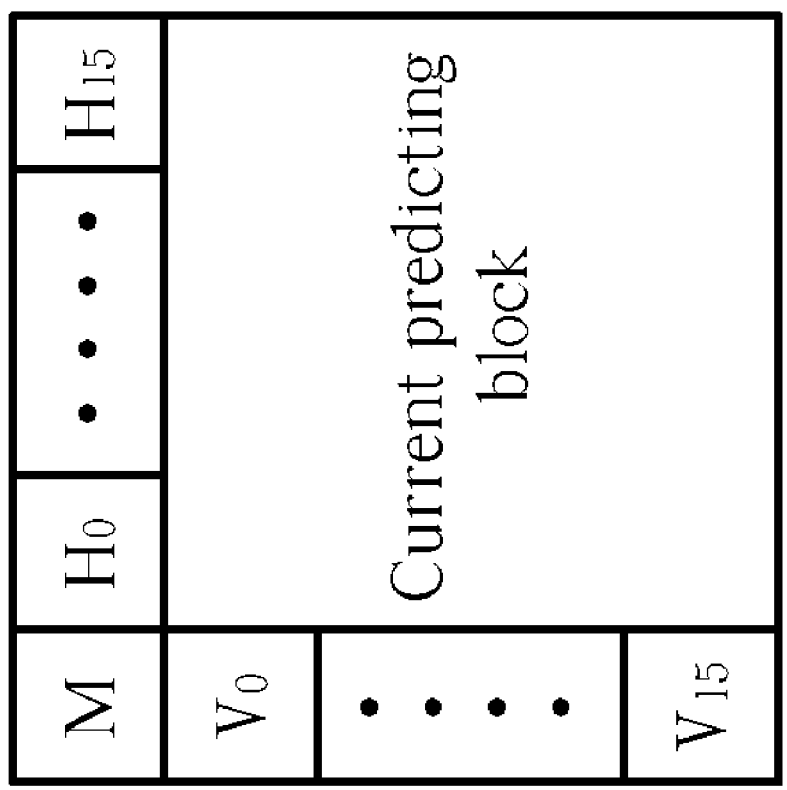
FIG. 6 is a diagram illustrating a notation of adjacent pixels to a current predicting block used in a 16×16 intra-prediction operation.

In the H.264 specification, there are also four 16×16 intra-prediction modes defined. For vertical mode, horizontal mode, and DC mode, it can be derived by following a procedure described previously for 4×4 intra-predictions and is omitted here. However, a 16×16 plan mode intra-prediction is more complicated and is discussed shortly hereinafter. Please refer to FIG. 6. FIG. 6 is a diagram illustrating a notation of adjacent pixels to a current predicting block used in a 16×16 intra-prediction operation. Please note that every following matrix expressed below denotes a 16×16 matrix. In a 16×16 plan mode, a 16×16 plan mode intra-prediction can be expressed by:

$$a\begin{bmatrix} 1 & \cdots & 1 \\ \vdots & \ddots & \vdots \\ 1 & \cdots & 1 \end{bmatrix} + b\begin{bmatrix} -7 & -6 & \cdots & 8 \\ \vdots & \vdots & \ddots & \vdots \\ -7 & -6 & \cdots & 8 \end{bmatrix} + c\begin{bmatrix} -7 & \cdots & -7 \\ -6 & \cdots & -6 \\ \vdots & \cdots & \vdots \\ 8 & \cdots & 8 \end{bmatrix} \quad (22)$$

where $a = 16(H_{15} + V_{15})$ $b = (5H + 32) >> 6$ (23)

$c = (5V + 32) >> 6$ and $$H = 8(H_{15} - M) + \sum_{h=0}^{6}(h+1)(H_{8+h} - H_{6-h}) \quad (24)$$

$$V = 8(V_{15} - M) + \sum_{v=0}^{6}(v+1)(V_{8+v} - V_{6-v}) \quad (25)$$

The values of a, b, and c are dependent on the neighboring pixel values. In the following, a computation to obtain H is illustrated and V, $H_{15}$, and $V_{15}$ can be easily obtained by a similar way.

Since only 4×4 MDCT-domain coefficient blocks are available, Eq. (24) is expanded into five terms according to a pixel location as shown in FIG. 6:

$$H=(5H_{12}+6H_{13}+7H_{14}+8H_{15})+(H_8+2H_9+3H_{10}+4H_{11})-(3H_4+2H_5+H_6)-(7H_0+6H_1+5H_2+4H_3)+8M \quad (26)$$

where $(5H_{12}+6H_{13}+7H_{14}+8H_{15})$ can be determined by making use of the following equation:

$$\begin{bmatrix} 0 & 0 & 0 & 1 \\ 0 & 0 & 0 & 1 \\ 0 & 0 & 0 & 1 \\ 0 & 0 & 0 & 1 \end{bmatrix} \begin{bmatrix} \times & \times & \times & \times \\ \times & \times & \times & \times \\ \times & \times & \times & \times \\ H_{12} & H_{13} & H_{14} & H_{15} \end{bmatrix} \begin{bmatrix} 5 & 5 & 5 & 5 \\ 6 & 6 & 6 & 6 \\ 7 & 7 & 7 & 7 \\ 8 & 8 & 8 & 8 \end{bmatrix} = \quad (27)$$

$$(5H_{12}+6H_{13}+7H_{14}+8H_{15}) \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Therefore, the value of $(5H_{12}+6H_{13}+7H_{14}+8H_{15})$ can be determined by extracting a DC value of the MDCT transform of the left-hand side of Eq. (27). The remaining terms of H in Eq. (26) can be obtained in a similar way.

Please note that the approach provided above for computing an intra-prediction in the MDCT domain is just an example and is not meant to be interpretive as limitations to the present invention. In addition, the video transcoding is performed through hardware circuitry shown in FIG. 1 and FIG. 2. However, the video transcoding can be implemented by software computation. For instance, a processor and a storage device are implemented to build the desired transcoder, where the storage device stores a transcoding program. Therefore, as the transcoding program loaded and executed by the processor, the processor is capable of performing the above-mentioned signal processing for transcoding an MPEG-2 input signal into an H.264 output signal. In other words, the processor running the transcoding program has functionality identical to that of a hardware transcoder mentioned above.

The present invention converts an MPEG-2 input signal into an H.264 output signal in the transform domain. In this way, computational complexity is reduced and the transcoding architecture is simplified. Additionally, performing a down-sampling operation in conjunction with a transform kernel conversion operation saves computational cost compared to that of performing the down-sampling operation and the transform kernel conversion operation separately. Moreover, by an above-mentioned approach for computing the candidate intra-predictions, parameters obtained after computing a specific candidate intra-prediction may also be utilized when computing some other candidate intra-predictions, further reducing computational complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transcoder for converting a digital video signal from a first format into a second format in a transform domain, the first format and the second format being respectively adopted by video coding schemes possessing different DCT transform kernels, the transcoder comprising:

a transform-domain decoder, coupled to the digital video signal, for decoding the digital video signal of the first format to generate a first DCT-domain signal, the first DCT-domain signal corresponding to a first DCT transform of the first format in the transform domain;

a transform kernel converter, coupled to the transform-domain decoder, for converting the first DCT-domain signal into a second DCT-domain signal, the second DCT-domain signal corresponding to a second DCT transform of the second format in the transform domain; and a transform-domain encoder, coupled to the transform kernel converter, for generating a resultant video signal encoded in the second format according to a differential signal, the transform-domain encoder comprising:

an adder for subtracting a prediction signal from the second DCT-domain signal to generate the differential signal; and an intra-predictor, coupled to the adder and the transform kernel converter, for generating the prediction signal in the transform domain according to the second DCT-domain signal.

2. The transcoder of claim 1, wherein the transform-domain encoder further comprises a compressing module, coupled to the adder, for compressing the differential signal to generate the resultant video signal.

3. The transcoder of claim 1, wherein the transform kernel converter generates the second DCT-domain signal by performing a linear transform on the first DCT-domain signal, and the linear transform corresponds to a combination of the second DCT transform and an inverse transform of the first DCT transform.

4. The transcoder of claim 1, wherein the transform kernel converter further performs down sampling when converting the first DCT-domain signal into the second DCT-domain signal.

5. The transcoder of claim 1, wherein the intra-predictor selects a best prediction from a plurality of candidate predictions in the transform domain to determine the prediction signal, and the candidate predictions correspond to a plurality of prediction modes, respectively.

6. The transcoder of claim 5, wherein the video coding schemes are block-based video coding schemes, the candidate predictions corresponding to a specific block of a specific image frame are generated according to at least a block adjacent to the specific block on the specific image frame and a plurality of predetermined operation matrices, and each of the prediction modes chooses a specific subset of the predetermined operation matrices to generate a corresponding candidate prediction.

7. The transcoder of claim 1, wherein the second format corresponds to an H.264 specification.

8. The transcoder of claim 7, wherein the first format corresponds to an MPEG-2 specification.

9. A transcoding method for converting a digital video signal from a first format into a second format in the transform domain, the first format and the second format being respectively adopted by video coding schemes possessing different DCT transform kernels, the transcoding method comprising:

decoding the digital video signal of the first format to generate a first DCT-domain signal, the first DCT-domain signal corresponding to a first DCT transform of the first format in transform domain;

converting the first DCT-domain signal into a second DCT-domain signal, the second DCT-domain signal corresponding to a second DCT transform of the second format in transform domain; and generating a resultant video signal encoded in the second format according to a differential signal, comprising:

subtracting a prediction signal from the second DCT-domain signal to generate the differential signal; and generating the prediction signal in the transform domain according to the second DCT-domain signal.

10. The transcoding method of claim 9, wherein the step of generating the resultant video signal further comprises compressing the differential signal to generate the resultant video signal.

11. The transcoding method of claim 9, wherein the transform kernel converter generates the second DCT-domain signal by performing a linear transform on the first DCT-domain signal, and the linear transform corresponds to a combination of the second DCT transform and an inverse transform of the first DCT transform.

12. The transcoding method of claim 9, wherein the step of converting the first DCT-domain signal into the second DCT-domain signal further performs down-sampling when converting the first DCT-domain signal into the second DCT-domain signal.

13. The transcoding method of claim 9, wherein the step of generating the prediction signal selects a best prediction from a plurality of candidate predictions in the transform domain to determine the prediction signal, and the candidate predictions correspond to a plurality of prediction modes, respectively.

14. The transcoding method of claim 13, wherein the video coding schemes are block-based video coding schemes, the candidate predictions corresponding to a specific block of a specific image frame are generated according to at least a block adjacent to the specific block on the specific image frame and a plurality of predetermined operation matrices, and each of the prediction modes chooses a specific subset of the predetermined operation matrices to generate a corresponding candidate prediction.

15. The transcoding method of claim 9, wherein the second format corresponds to an H.264 specification.

16. The transcoding method of claim 9, wherein the first format corresponds to an MPEG-2 specification.

17. A transcoder for converting a digital video signal from a first format into a second format in the transform domain, the first format and the second format being respectively adopted by video coding schemes possessing different DCT transform kernels, the transcoder comprising:

means for decoding the digital video signal of the first format to generate a first DCT-domain signal, the first DCT-domain signal corresponding to a first DCT transform of the first format in the transform domain;

means for converting the first DCT-domain signal into a second DCT-domain signal, the second DCT-domain signal corresponding to a second DCT transform of the second format in the transform domain; and means for generating a resultant video signal encoded in the second format according to a differential signal, comprising:
subtracting a prediction signal from the second DCT-domain signal to generate the differential signal; and
generating the prediction the transform domain according to the second DCT-domain signal.

18. A transcoder for converting a digital video signal from a first format into a second format in the transform domain, the first format and the second format being respectively adopted by video coding schemes possessing different DCT transform kernels, the transcoder comprising:

a processor; and a storage device, coupled to the processor, for storing a transcoding program, wherein the transcoding program executed by the processor is capable of:

decoding the digital video signal of the first format to generate a first DCT-domain signal, the first DCT-domain signal corresponding to a first DCT transform of the first format in the transform domain;

converting the first DCT-domain signal into a second DCT-domain signal, the second DCT-domain signal corresponding to a second DCT transform of the second format in the transform domain; and generating a resultant video signal encoded in the second format according to a differential signal, comprising:
subtracting a prediction signal from the second DCT-domain signal to generate the differential signal; and
generating the prediction signal in the transform domain according to the second DCT-domain signal.

* * * * *